(12) United States Patent
Hensen et al.

(10) Patent No.: US 11,247,394 B2
(45) Date of Patent: Feb. 15, 2022

(54) ADDITIVE MANUFACTURING TECHNIQUES

(71) Applicant: COLORADO STATE UNIVERSITY RESEARCH FOUNDATION, Fort Collins, CO (US)

(72) Inventors: Tucker J. Hensen, Fort Collins, CO (US); Troy B. Holland, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 17/256,620

(22) PCT Filed: Sep. 27, 2019

(86) PCT No.: PCT/US2019/053510
§ 371 (c)(1),
(2) Date: Dec. 28, 2020

(87) PCT Pub. No.: WO2020/069351
PCT Pub. Date: Apr. 2, 2020

(65) Prior Publication Data
US 2021/0268729 A1    Sep. 2, 2021

Related U.S. Application Data

(60) Provisional application No. 62/737,582, filed on Sep. 27, 2018.

(51) Int. Cl.
*B29C 64/106* (2017.01)
*B33Y 10/00* (2015.01)
(Continued)

(52) U.S. Cl.
CPC .......... *B29C 64/165* (2017.08); *B29C 64/106* (2017.08); *B33Y 10/00* (2014.12); *B33Y 70/00* (2014.12)

(58) Field of Classification Search
CPC ............................. B33Y 10/00; B29C 64/106
See application file for complete search history.

(56) References Cited

U.S. PATENT DOCUMENTS

2012/0237631 A1*   9/2012   Jenko .................. B29C 45/2725
                                                              425/547
2016/0347003 A1*   12/2016   Marsh .................. B29C 64/118

FOREIGN PATENT DOCUMENTS

CN             107200597 A  *  9/2017

OTHER PUBLICATIONS

Hensen. Development of a Novel Additive Manufacturing Method: Process Generation and Evaluation of 3D Printed Parts Made With Alumina Nanopowder. Colorado State University (Year: 2017).*
(Continued)

*Primary Examiner* — Cachet I Proctor
(74) *Attorney, Agent, or Firm* — Maschoff Brennan; Paul G. Johnson

(57) ABSTRACT

The present document generally relates to additive manufacturing techniques for forming an article having a desired shape and other properties. More particularly, but not exclusively, in one embodiment a method for additive manufacturing an article includes adding a dispersant to an article forming material in the absence of binder to prepare a slurry or suspension including the material and the dispersant. The pH of the slurry may be adjusted to control the viscosity and/or coagulation rate of the slurry. The slurry may then be passed through an extrusion-based three-dimensional printing apparatus to form or print the article in a desired form or shape, and the article may thereafter be sintered. In one aspect, through control of the pH of the slurry, the viscosity and/or coagulation rate properties of the slurry may be tailored for use with different operating parameters of the extrusion-based three-dimensional printing apparatus.

20 Claims, 12 Drawing Sheets

(51) Int. Cl.
    *B29C 64/165*     (2017.01)
    *B33Y 70/00*     (2020.01)

(56) References Cited

OTHER PUBLICATIONS

He et al. Robocasting and mechanical testing of aqueous silicon nitride slurries. Sandia National Laboratories. retrieved from https://digital.library.unt.edu/ark:/67531/metadc715030/m2/1/high_res_d/760781.pdf (Year: 2000).*
Xu et al. Direct Coagulation Casting of Alumina Suspension from Calcium Citrate Assisted by pH shift. J. American Ceramic Society . 97[4] pp. 1048-1053. 2014. (Year: 2014).*
International Search and Written Opinion, PCT/US2019/053510 dated Mar. 11, 2020.
Hensen et al. "Additive manufacturing of ceramic nanopowder by direct coagulation printing" Additive Manufacturing vol. 23, Oct. 2018, pp. 140-150 https://doi.org/10.1016/j.addma.2018.07.010.
Hensen et al. "Development of a novel additive manufacturing method: process generation and evaluation of 3D printed parts made with alumina nanopowder" Colorado State University (Fall 2017): pp. 1-104.
Cai et al. "Solid freeform fabrication of alumina ceramic parts through a lost mould method" Journal of the European Ceramic Society vol. 23, Issue 6, May 2003, pp. 921-925 https://doi.org/10.1016/S0955-2219(02)00229-7.
Guo et al. "Gelcasting based solid freeform fabrication of piezo-electric ceramic objects" Scripta Materialia vol. 47, Issue 6, Sep. 16, 2002, pp. 383-387 https://doi.org/10.1016/S1359-6462(02)00132-X.

* cited by examiner

ADDITIVE MANUFACTURING TECHNIQUES

CROSS-REFERENCE TO RELATED APPLICATIONS

This application claims the benefit of U.S. Provisional Patent Application No. 62/737,582, filed Sep. 27, 2018, the content of which is incorporated herein by reference in its entirety.

BACKGROUND

The present document generally relates to additive manufacturing techniques for forming articles having desired shapes and properties. More particularly, but not exclusively, the present document relates to techniques for forming a articles with an extrusion-based three-dimensional printing apparatus. In one aspect, an article is formed of a material which is prepared in a slurry in the absence of a binder. Instead of a binder, a dispersant is used to coagulate the material to promote solidification of the slurry and provide a material which has properties suitable for extrusion-based three-dimensional printing, and that retains near-net geometry of the article after printing.

Various articles, including ceramic articles for example, have traditionally been manufactured using subtractive manufacturing techniques. However, some limitations have been encountered in connection with use of these techniques. For example, when a ceramic material is used, due to the inherent hardness and brittleness of the ceramic material from which they are formed, articles made from this traditional approach may have less than optimal geometries for some applications. In addition, production of components having a more complex three-dimensional geometry may be challenging. More recent additive manufacturing techniques have facilitated production of parts having have more complex three-dimensional geometry, including those with overhangs or hollow enclosures, for example. By way of example, extrusion-based three-dimensional printing is viewed as a cost-effective method of additive manufacturing which can produce parts, from a variety of different materials, having more complex three-dimensional geometry.

Additive manufacturing processes such as binder jetting, stereolithography, direct ink writing, selective laser sintering/meltin and laser chemical vapor deposition have been used to form ceramic and other articles. In these processes, the use of nanometric precursor powders may improve sinterability of the ceramic article due to enhanced thermodynamic driving forces for diffusion arising from small radii of curvature at surface interfaces and increased surface area. The use of nanometric precursor powders may also allow final grain sizes after sintering to remain in the nano-scale, resulting in high density parts with good mechanical and electrical properties relative to traditionally manufactured ceramic articles. In addition, the use of nanometric precursor powders may allow for specific, targeted grain sizes for a number of different applications.

Subtractive manufacturing and additive manufacturing techniques previously used to produce ceramic and other articles utilized a binder or binding agent which is added to the material to bind or draw particles of the material together. When a binder is used, the resulting article must be subjected to a binder removal step to facilitate burnout of the binder after the article is produced in a green form. When present in the process, this step lengthens the process, requires the use of additional resources, and likewise increases attendant manufacturing costs. In addition, removal of the binder or binding material may leave behind impurities, large pores, or cause warpage of the article.

In view of the foregoing, there remains a need for further contributions in this area of technology.

The claimed subject matter is not limited to embodiments that solve any disadvantages or that operate only in environments such as those described above. Rather, this background is only provided to illustrate examples of where the present disclosure may be utilized.

BRIEF SUMMARY

The present document generally relates additive manufacturing techniques for forming articles having desired shapes and properties. More particularly, but not exclusively, the present document relates to techniques for forming articles with an extrusion-based three-dimensional printing apparatus. In one aspect, the article is formed of a material which is prepared in a slurry in the absence of a binder. Instead of a binder, a dispersant is used to coagulate the material to promote solidification of the slurry and provide a material which has properties suitable for extrusion-based three-dimensional printing, and that retains near-net geometry of the article after printing. In one form, the material includes ceramic nanoparticles and the dispersant coagulates the ceramic nanoparticles.

In one embodiment, a method for additive manufacturing an article includes preparing a mixture including a slurry of an article forming material through the addition of a dispersant to the article forming material in the absence of a binder. The method also includes adjusting the pH of the mixture to control at least one of viscosity and a coagulation rate of the slurry. In addition, the method includes passing the mixture through an extrusion-based three-dimensional printing apparatus to form the article. In one aspect of this embodiment, the article forming material is a ceramic material. In another aspect, the article forming material includes a metal or metal alloy.

In another embodiment, a method includes preparing a mixture including a slurry of an article forming material and a dispersant. The method also includes passing the mixture through an extrusion-based three-dimensional printing apparatus to form an article in a green state, and sintering the article in the green state without performing an intermediate binder removal heating step to provide the article in a sintered state. In one aspect, the article forming material may be a ceramic material.

This Summary is provided to introduce a selection of concepts in a simplified form that are further described below in the Detailed Description. This Summary is not intended to identify key features or essential characteristics of the disclosed subject matter, nor is it intended to be used as an aid in determining the scope of the disclosed subject matter.

Additional features and advantages will be set forth in the description which follows, and in part will be obvious from the description, or may be learned by the practice of the invention. The features and advantages may be realized and obtained by means of the instruments and combinations particularly pointed out in the appended claims. These and other features of the present invention will become more fully apparent from the following description and appended claims, or may be learned by the practice of the invention as set forth hereinafter.

DETAILED DESCRIPTION

For purposes of promoting an understanding of the present disclosure, reference will now be made to the following embodiments and specific language will be used to describe the same. It will nevertheless be understood that no limitation of the scope of the disclosure is thereby intended, such alterations and further modifications in the described subject matter, and such further applications of the disclosed principles as described herein being contemplated as would normally occur to one skilled in the art to which the disclosure relates.

The terms and words used in the following description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present document generally relates additive manufacturing techniques for forming articles having desired macrostructure and microstructure properties. More particularly, but not exclusively, the present document relates to techniques for forming articles with an extrusion-based three-dimensional printing apparatus. In one aspect, the article is formed of nanoparticles which are prepared in a slurry in the absence of a binder. Instead of a binder, a dispersant is used to coagulate the nanoparticles to promote solidification of the slurry and provide a material which has properties suitable for extrusion-based three-dimensional printing and that retains near-net geometry of the article after printing.

For the additive manufacturing processes disclosed herein, a slurry is prepared having a solids content intended to avoid shrinkage of a green article and facilitate sintering to greater than about 97% theoretical density. In one form for example, the solids content of the slurry may be in the range of about 20% to about 80%, although other values are possible. For example, the solids content may be in the range of about 30% to about 70%, about 35% to about 65%, about 40% to about 60%, or about 45% to about 55%, just to provide a few non-limiting examples.

Figure 1:
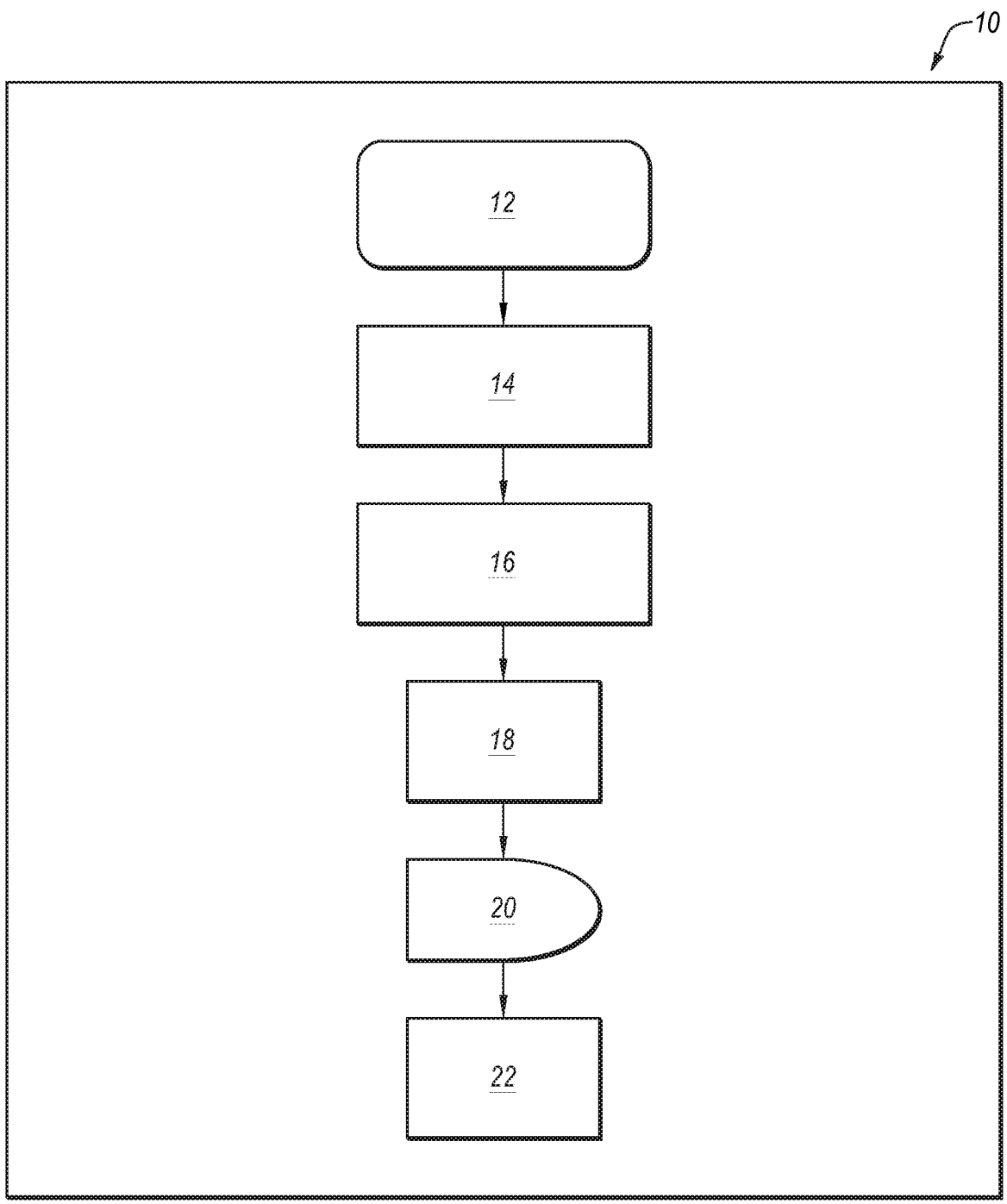
FIG. 1 is a schematic diagram illustrating an additive manufacturing process.
Figure 2:
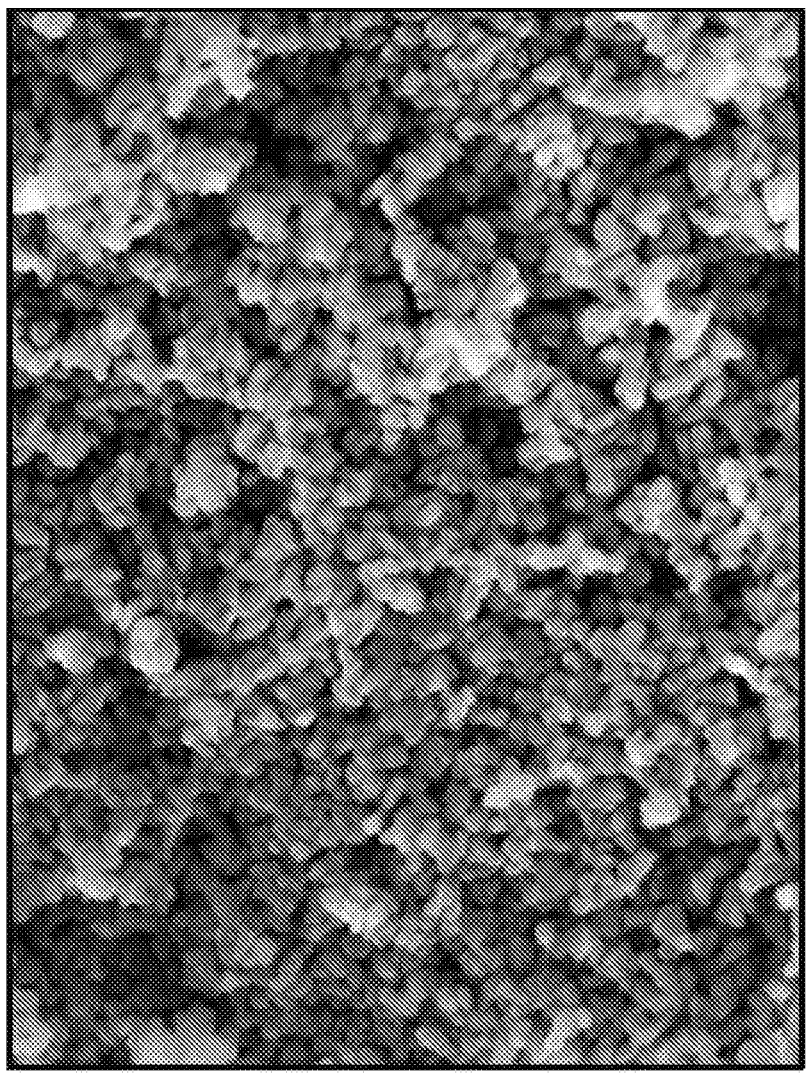
FIG. 2 is an SEM image of an alumina powder which may be used in a process according to FIG. 1.

With reference to FIG. 1 for example, where a schematic diagram of one non-limiting additive manufacturing process is illustrated, a process 10 includes the preparation of a slurry at step 12. After the slurry has been prepared, it may be ball milled at step 14, and then at step 16 the pH of the slurry may be altered in order to control properties of the slurry, such as viscosity and/or coagulation rate. After the pH of the slurry has been altered, it is fed through an extrusion-based three-dimensional printing apparatus to form the article at step 18. At step 20, the article is allowed to cure for some period of time before it is sintered at step 22. It should be appreciated that additional or alternative steps may be included in process 10 depending on, for example, the article to be formed and the material from which it is formed. Additional information on each of steps 12-22 is provided below. The slurry used in process 10 may be prepared by adding a dispersant and water to an article forming material in the absence of a binder or binding material. Stated alternatively, it should be appreciated that coagulation of the material will be caused by the dispersant and not through the use of any binder or binding material. Moreover, it should be appreciated that components beyond those identified above, and which are not binders or binding materials, may also be included in the slurry. In one form, the dispersant may be a polyvalent salt. For example, in one particular but non-limiting form, the dispersant includes tri-ammonium citrate, ammonium poly(methacrylate), aurintricarboxylic acid ammonium salt, or (4-5-dihydroxy-1, 3-benzenedisulfonic acid disodium salt. It should be appreciated that alternative polyvalent salts similar to those identified herein may also be used, and that the use of mixtures including more than one polyvalent salt are contemplated. The article forming material may include, for example, a ceramic, metal, metal alloy or mixtures thereof, just to provide a few non-limiting examples. In one form, the article forming material may be in a nano-particle or nanogranular form. For example, when a ceramic material is used, the ceramic material may include a ceramic nanopowder or ceramic nano-particles. In one more particular form, the ceramic material may include an alumina nanopowder. In one form, an alumina slurry is prepared with 99.0% pure α-phase $Al_2O_3$ powders with an average particle diameter of 150 nm (Skyspring Nanomaterials, USA), although other variations are possible. FIG. 2 is an SEM image showing uniform particle diameter of approximately 150 nm and a roughly spherical shape of an alumina powder which may be used. However, it is also envisioned that alternative ceramic materials or a mixture of different ceramic materials could be used including, for example, zirconia, magnesium Oxide, boron nitride, aluminum nitride, silicon carbide, tungsten carbide, or mixtures thereof.

After preparation of the slurry, the resulting mixture may be milled at step 14 of process 10. In one form, a high energy ball mill may be used to mill the slurry which is placed in one or more ball milling jars before the milling process and retained therein during the milling process. The ball milling jars are sealed to prevent the escape of any vapors arising during mixing, and to otherwise eliminate or decrease the exposure of the slurry to unsealed, ambient atmospheric conditions. It should be appreciated that such exposure may induce premature coagulation of the slurry due to evaporation of water or the dispersant. For example, when the dispersant is tri-ammonium citrate, exposure of the slurry to ambient atmospheric conditions may induce evaporation of ammonia and water.

With the jars properly sealed, they may be loaded into the high energy ball mill and milled for a desired period of time. In one form, the slurry may be milled for a total of one to two hours, although other variations are possible. For example, the total time the slurry may be milled could be in the range of about thirty minutes to about five hours, about thirty minutes to about three hours, about forty five minutes to about two hours, about forty five minutes to about one and thirty minutes, about forty five minutes to about one hour and fifteen minutes, or about forty five minutes to about one hour. However, it should be appreciated that other variations are possible. In addition, the ball milling may be performed continuously or cyclically until the total desired period of time for milling is satisfied. For example, the ball milling may be conducted using a cycle of on/off for a certain period of time, such as about five minutes on and about five minutes off. Other variations are possible however. The ball milling may be conducted at operating rates of the ball mill in the range of about 100 to about 1000 rpm, about 200 to about 800 rpm, about 200 to about 600 rpm, about 250 to about 600 rpm, or about 250 to about 550 rpm, although other ranges are possible.

Following preparation and ball milling, viscosity and coagulation characteristics of the slurry may be controlled by adjusting the pH of the slurry. For example, the slurry can be transitioned from a liquid to a paste and to a coagulated solid by shifting pH from its original state. It should be understood that viscosity and coagulation characteristics relative to pH will vary dependent on the particular formulation of a slurry. Moreover, control of viscosity and coagulation characteristics by adjusting the pH of the slurry may be used to provide slurries which include nanoparticles or nano-granular materials and that also have low viscosity and a high solids content. These properties may facilitate use of the slurries in, for example, a three-dimensional printing process that ultimately yields complete and fully dense sintered articles. In contrast, slurries including nanoparticles or nano-granular materials where the viscosity and coagulation characteristics are not controlled by adjusting pH of the slurry can cause agglomeration and feedstock homogeneity issues when used in a three-dimensional printing process. These issues may limit, for example, the amount of solid material which may be present in the slurry and, in turn, may not allow for complete and fully dense articles.

For the sake of providing additional description on the control of viscosity and coagulation properties, and without intending to be limited to any particular theory or form, in one example a slurry may have a pH in the basic range following preparation and subsequent ball milling, and the slurry may still be in the form of a liquid or have liquid-like properties. For use in an extrusion-based three-dimensional printing apparatus as described herein, the slurry must transition to have a more solid-like consistency, similar to a paste for example. In this example, this transition will occur at the pH of the slurry in the basic range, and the fluid-to-solid transition of the slurry is controlled by a pH shift with the polyelectrolyte dispersant or coagulant resulting in the coagulation of particles out of colloidal suspension. However, for this example the transition may occur so quickly at this pH that the slurry coagulates to such an extent that it is no longer usable in an extrusion-based three-dimensional printing apparatus.

As further description, and again without the intention of being bound to any particular theory, the aggregation process may occur as particles in suspension become unstable due to reduction of zeta potential and changing ion concentration in an in situ chemical reaction. The DLVO theory of colloid stability may be used to analyze this as a symmetric system with homo-aggregation. More specifically and by way of example only, when the slurry includes tri-ammonium citrate, the citrate ion in tri-ammonium citrate is a multivalent ion, with charges ranging from −1 to −3 eV, as ammonium ions dissociate with increasing pH. The three $pK_a$ values of tri-ammonium citrate are at pH 3.1, 4.8, and 6.4. As such, when the slurry has a pH in the basic range, such as a pH of around 8-9, about 5-6 orders of magnitude more positive ions are present at this pH than at a pH of 3. At a pH of about 8-9, citrate ions have a valence of 3, and Debye length is at its shortest with coagulation occurring very rapidly, perhaps even in seconds. However, when pH is shifted to the acidic range by the addition of an acid for example, ammonia evaporation is reduced as a result of reduced ammonium ion dissociation, slowing the evaporation of water and allowing for longer coagulation time. Viscosity is also increased, which decreases diffusion throughout the slurry, and further increases coagulation time and working life.

In connection with this transition of the slurry, interparticle relationships and ammonia evaporation rates of the slurry based on DLVO theory were calculated using Equation (1), where $\varphi$ is the double layer force, $z$ is the valence of the respective ions, $e$ is the electron charge, $\varepsilon$ is the dielectric constant of the medium, $\varepsilon_0$ is the permittivity of free space, and $\delta$ is the interparticle spacing. Equation (2) is the Van der Waals force ($\phi$), where $A_H$ is the Hamaker constant and $R_s$ is the particle radius. Equation (3) is the Debye length ($\kappa^{-1}$), $z_i$ is the counterion valence, and $c_i^\infty$ is the counterion concentration.

$$\varphi = \frac{z_1 z_2 e^2}{4\pi\varepsilon\varepsilon_0 \delta} \quad (1)$$

$$\phi = -\frac{A_H R_s}{12\delta} \quad (2)$$

$$\kappa^{-1} = \left\{ 5.404 \times 10^{\wedge}15 \sum_i z_i^2 c_i^\infty \right\}^{-\frac{1}{2}} \quad (3)$$

Figure 3:
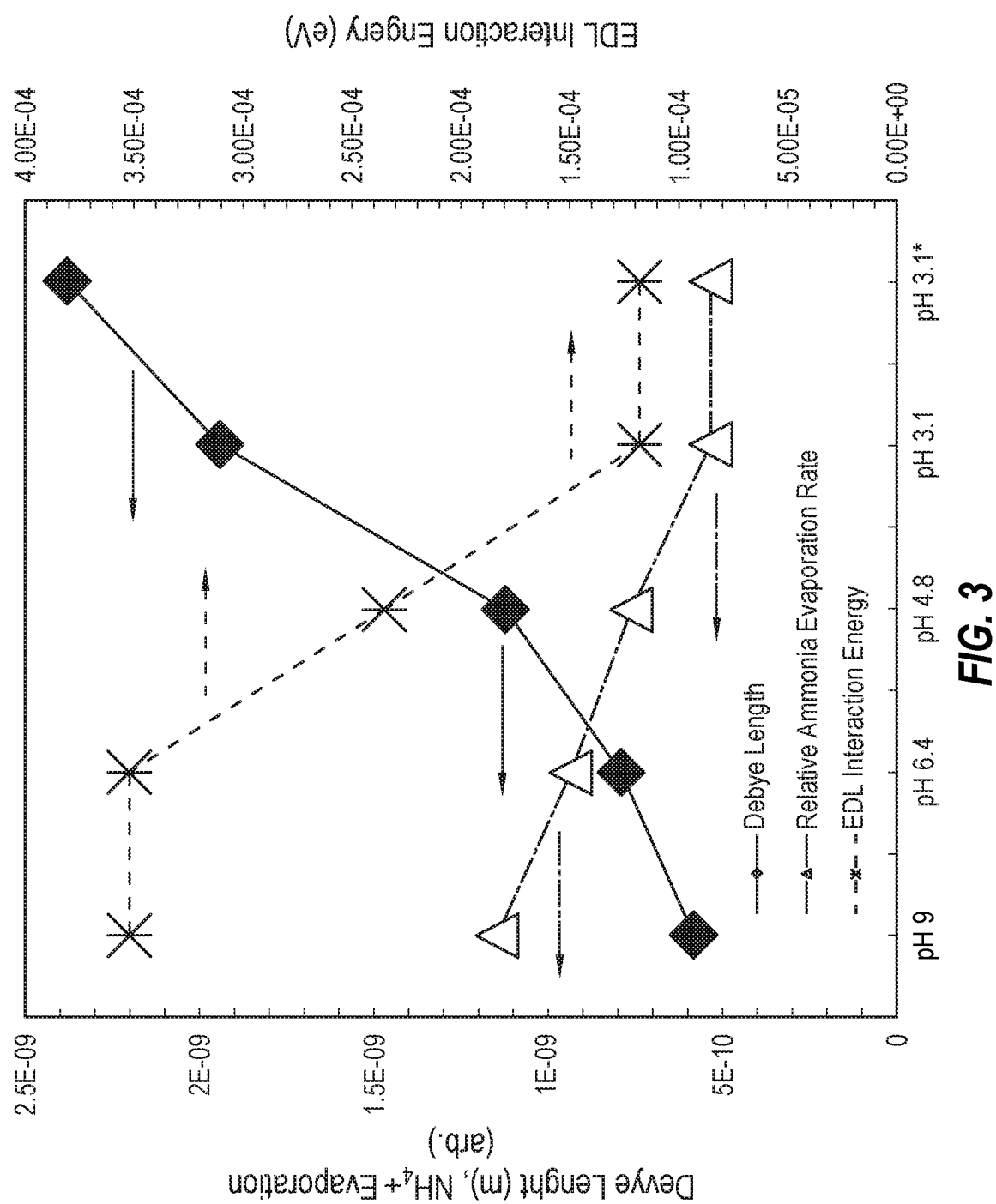
FIG. 3 is a graphical illustration of the relationship between Debye Length, EDL Interaction Energy, and Ammonia Evaporation Rate at different pH values of a slurry.

Tri-ammonium citrate acts as a weak acid in aqueous solution and changes the electrical interactions between particles through modification of the electrical double layer force and Debye length, and the effects of this may be derived from Equations 1-3. A graphical illustration in FIG. 3 illustrates the relationship between Debye Length, EDL Interaction Energy, and Ammonia Evaporation Rate at different pH values (where pH 3.1* represents pH 3.1 after significant ammonia evaporation).

Figure 4:
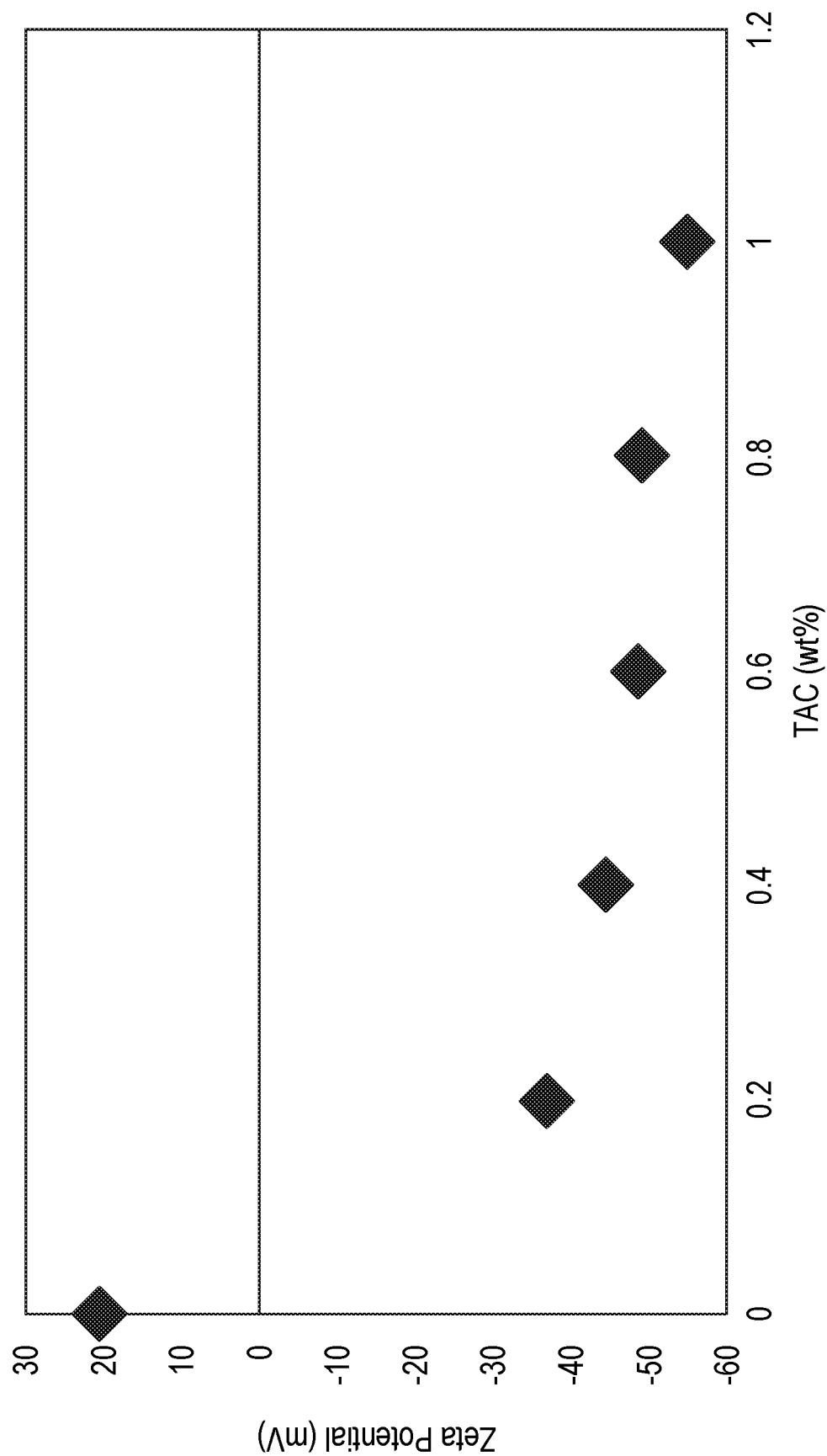
FIG. 4 is a graphical illustration of the zeta potential of alumina at different concentrations of tri-ammonium citrate in a slurry.
Figure 5:
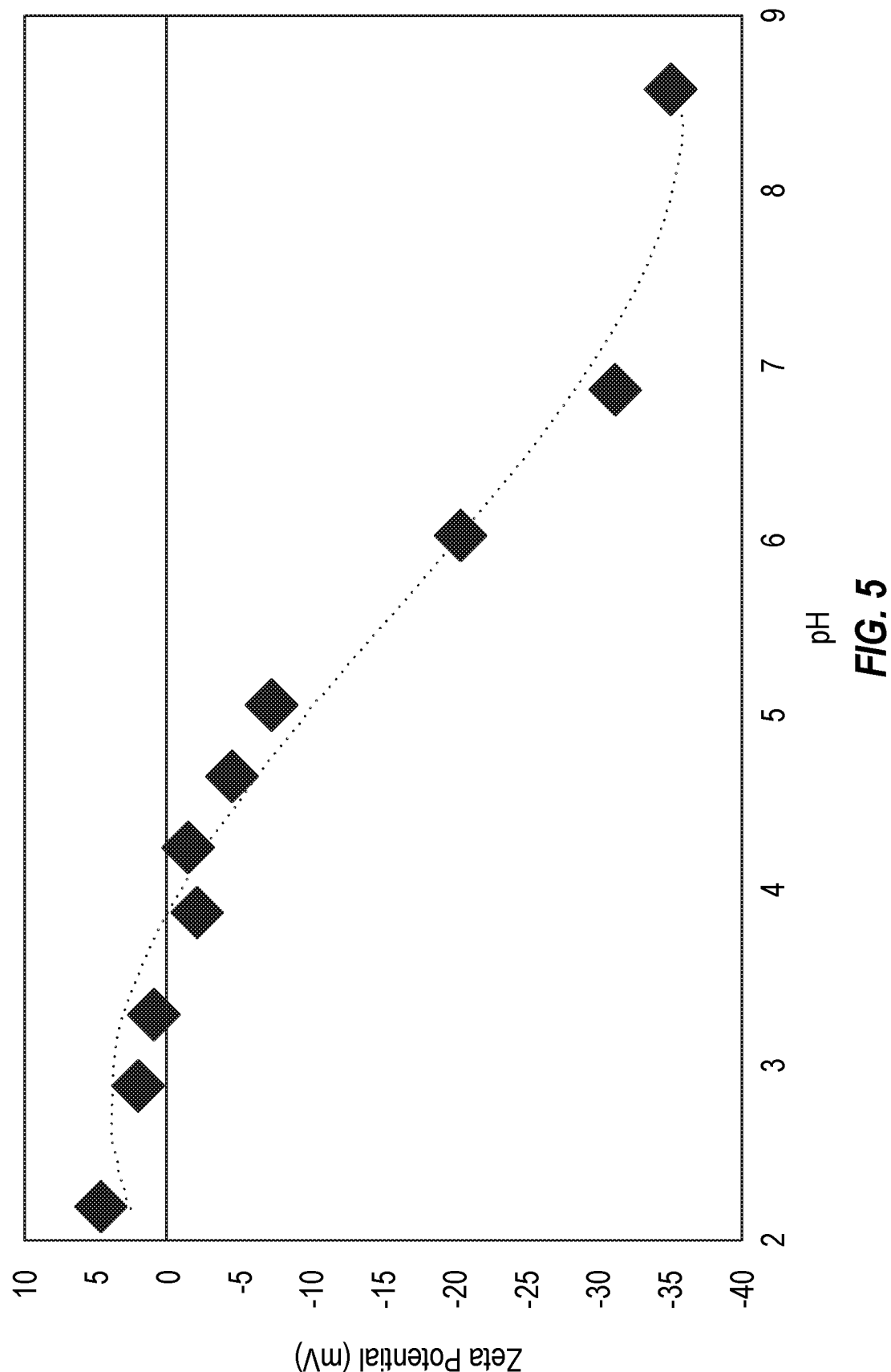
FIG. 5 is a graphical illustration of the zeta potential of alumina at different pH levels of a slurry.

As shown in the graphical illustrations of FIGS. 4 and 5 for example, the zeta potential of alumina was measured with respect to tri-ammonium citrate concentration and different pH values. Zeta potential measurements were taken using a dynamic light scattering (DLS) instrument (Zetasizer Nano ZS, Malvern Instruments, United Kingdom). For these, alumina powder was mixed at 0.5 vol % in DI water, with various concentrations of tri-ammonium citrate, and loaded into transparent cuvettes. From FIG. 4, it can be seen that the zeta potential magnitude increases steadily with increased tri-ammonium citrate concentration, reaching a saturation value of −55 mV at concentrations above 0.8 wt %. From FIG. 5, it can be seen that the zeta potential is positive around pH 2, decreases to zero, or the IEP, at around pH 4-4.5, and then becomes relatively large and negative as the slurry is adjusted into the basic region of pH.

Viscosity values were also established for a slurry at different pH levels of the slurry. Viscosity measurements were performed with a Viscolead Pro viscometer (Fungilab, Spain) with an L4 spindle and a shear rate of 132 With reference to FIG. 6 for example, there is graphically illustrated viscosity values relative to different pH levels of a slurry. As mentioned above, the pH value of the slurry may be changed through the addition of an acid, such as, but not limited to, nitric acid. For a slurry prepared at 50 vol % of alumina with 0.3 wt % tri-ammonium citrate, the pH is initially near the IEP of alumina (pH 8-9) and the slurry is at its lowest viscosity, allowing the assumption that the mixture is at its most homogenous and well dispersed state. After the dissociated ammonium molecules from tri-ammonium citrate are deprotonated to form ammonia, the ammonia evaporates out of solution, as shown in equation (4), causing a pH shift and change in electrical interaction forces between particles. As a result, the ceramic particles coagulate as the suspension moves into the unstable region.

$$NH_4^+ + OH^- \rightleftharpoons NH_3 \cdot H_2O \uparrow \qquad (4)$$

With the foregoing in mind, it should be appreciated that viscosity and coagulation rates of the slurry, and in turn extrudability properties and solidification behavior of the slurry, may be modified by adjusting pH levels of the slurry. For slurries where tri-ammonium citrate is present for example, as the pH becomes more acidic, ammonia evaporation rate decreases, interparticle attractive forces are lowered, and Debye length increases, all of which contribute to a tunable suspension with higher viscosity and a lower coagulation rate. Similarly, modification of the pH allows precise tuning of the viscosity and coagulation rate of the slurry, such that the slurry may be adapted to a variety of different printing conditions and printer styles.

Figure 6:
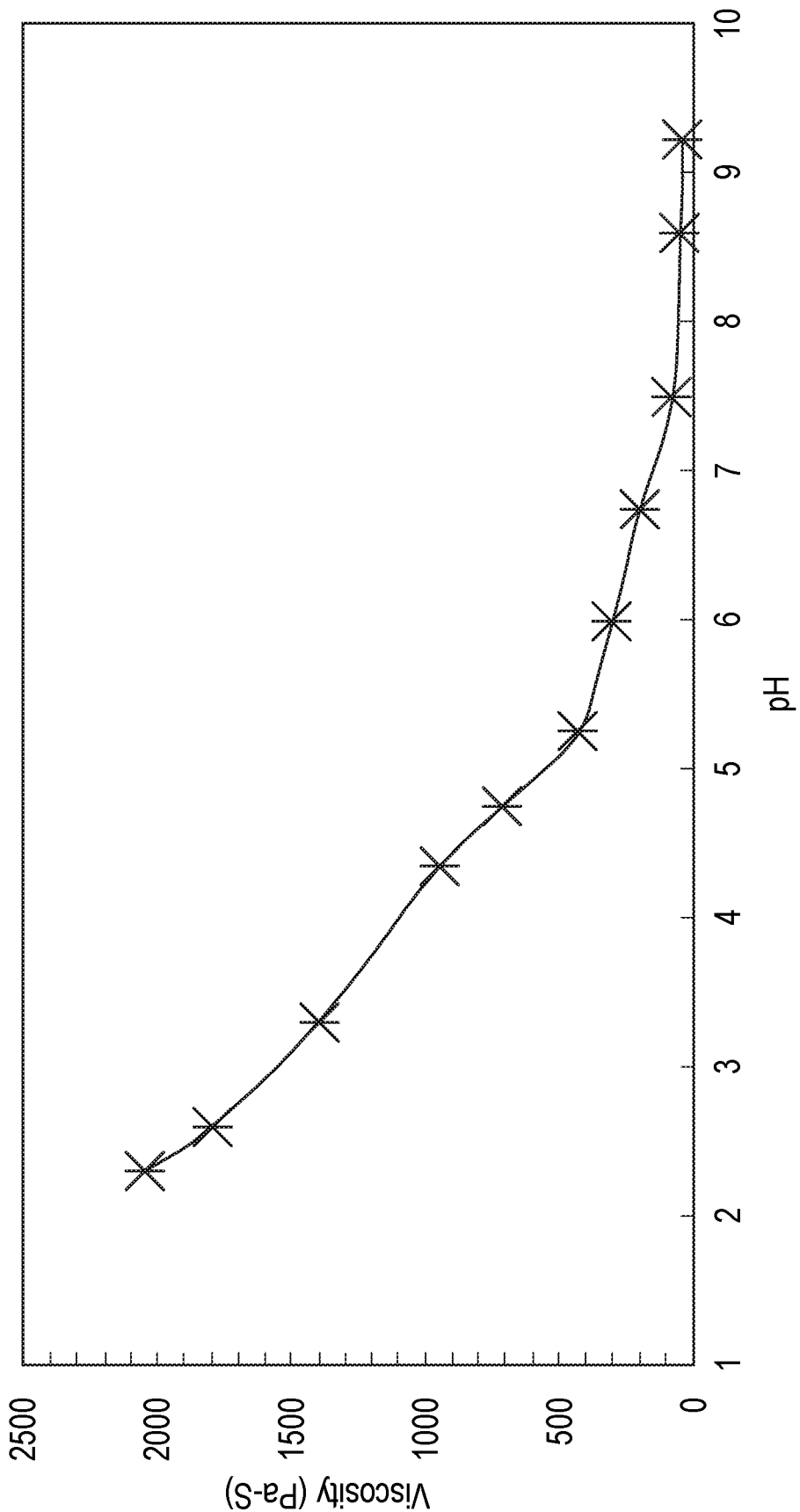
FIG. 6 is a graphical illustration of the viscosity of a slurry at different pH levels.

As shown in FIG. 6, viscosity of the slurry changes little until the pH of the slurry is below 6.4, then it increases nearly linearly until a pH of 3.1. By way of example, for an extrusion-based three-dimensional printing apparatus having a nozzle diameter of 600 μm, optimal viscosity for extrusion was found to be between 750 and 1000 Pa·s, correlating to a pH between 4.00 and 4.30 as found in the graphical illustration of FIG. 6. This pH range also corresponds coincidentally to the IEP of the system, suggesting that it is in this range that the strongest particle networks are formed due to lack of repulsive forces. Similarly, using slurries having a viscosity which is particularly selected for a specific printing system operating with certain parameters may result in the production of green parts which have increased strength and density.

After the slurry has been prepared and the pH thereof modified to provide the slurry with desired viscosity and coagulation rate properties for a particular extrusion-based three-dimensional printing process, the slurry is extruded to print a near-net shape of the desired article. In one form, for performance of this step, the slurry should have properties which provide it with a viscosity which is sufficiently low for extrusion, allow the near-net shape article to become sufficiently stiff to retain the intended shape under its own weight, and also promote coagulation which is sufficient to form green parts that are strong enough to be handled for sintering.

While not previously discussed, it should be appreciated that various printing parameters may be established, and then a slurry which is most compatible with those printing parameters may be prepared. The different printing parameters may include, for example, volumetric flow rate, movement speed of the printhead, and print-bed temperature. When establishing the desired parameters, it may be factored that inadequate flow rate may leave incomplete and broken segments of material or cause the slurry to spread poorly, and that inadequate movement speed may cause slurries to coagulate and clog in the nozzle or coagulate too fast on the print-bed resulting in poor layer adhesion. In one form, a flow rate of 0.0028 cm³/s paired with a movement speed of 10 mm/s with the print-bed at ambient temperature may be utilized. It should be further appreciated that the ability to utilize different printing parameters, and likewise provide a slurry suited for use at different parameters, provides the ability to control the density of the material used to form the article and, in turn, produce targeted densities and grain sizes throughout the article. As such, beyond providing an article with a desired shape or geometry, a microstructure of the article may be provided.

Figure 7:
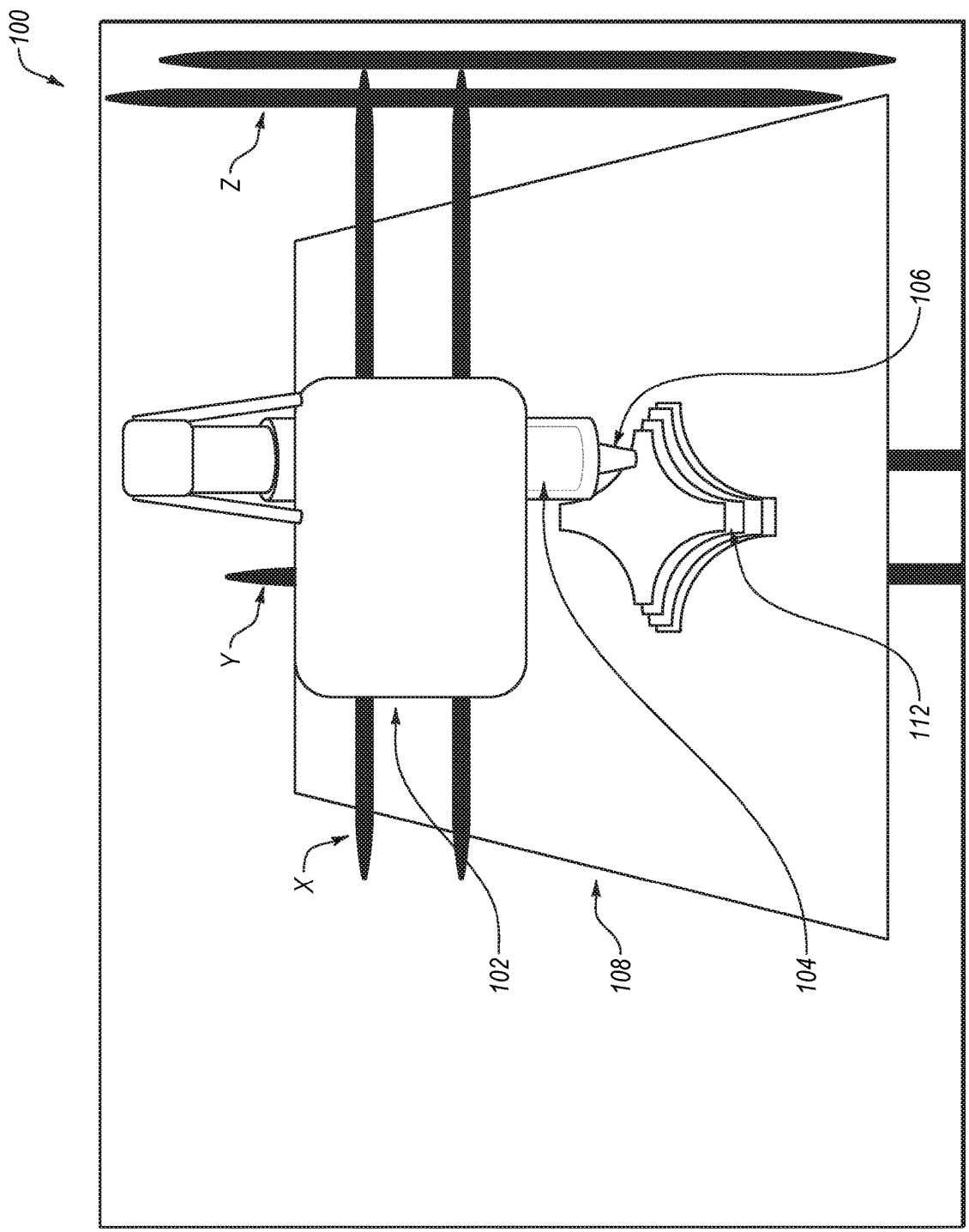
FIG. 7 is a schematic illustration of an extrusion-based three-dimensional printing apparatus.

One non-limiting form of an extrusion-based three-dimensional printing apparatus 100 is schematically illustrated in FIG. 7. Apparatus 100 includes an extruder 102 into which a slurry 104 may be delivered. The extruder includes a nozzle 106 and is configured to force slurry 104 through nozzle 106 for discharge in a manner that forms article 112 in a desired shape. In the illustrated form, apparatus 100 also includes a print bed 108 on which article 112 is formed during operation of extruder 102. It should be appreciated that extruder 102, as well as nozzle 106 thereof, is movable in three dimensions as illustrated by axes X, Y and Z in FIG. 7 in order to facilitate production of articles having complex geometries.

While not shown, it should be understood that apparatus 100 may include one or more computers, controllers or similar components that control movement of extruder 102 in order to provide article 112 with its desired shape. For example, a desired design or shape of article 112 may be programmed into a controller, and then the controller may control or adjust different operating parameters of apparatus 100 in order to provide article 112 with the desired shape or design. In one form for example, the controller may control movement of extruder 102 along axes X, Y and Z and/or adjust application rate of slurry 104 from nozzle 106. However, it should be understood that other operating parameters of apparatus 100 may be controlled by a controller or computer.

Complete coagulation or curing of the green article may take longer than printing, so some time may pass after the article is printed to ensure sufficient green strength for removal and handling of the article. In one form for example, it may take between about thirty and about sixty minutes for a material that was extruded at a pH of about 4.5. While individual layers may have acceptable microstructure and properties, if adhesion between layers is not complete, green strength, sintered density, and sintered strength may be affected. Due to the nature of the coagulation process, particles in successive layers may form attractive networks with each other, resulting in excellent layer adhesion.

After the article has cured, it may be subjected to a sintering process. For example, in one form the article is sintered in atmosphere in a high-temperature furnace (Thermolyne 4610, USA). The sintering schedule may have a relatively fast (100° C./minute) heating rate to above 1200° C., followed by a slower heating rate (25° C./minute) to a hold temperature of either 1500, 1550, 1600, 1650, or 1750° C. for between 1 to 16 hours according to increase temperature. It should be appreciated that these sintering conditions are merely examples and that other conditions are contemplated and possible. Once the proper heating has been completed, the article may be allowed to naturally cool in the furnace. While not previously mentioned, it should be noted that no intermediate binder removal step is necessary between the green and sintered states of the article since the slurry was prepared without, or in the absence of, a binder or binding material. Similarly, once the article is cured to a point it has sufficient green strength for removal from apparatus 100 and handling, it may be sintered without the completion of any other step.

During the sintering process, it should be appreciated that shrinkage of the article may occur. However, due to the isotropic and consistent nature of the shrinkage encountered with articles produced according to the techniques disclosed herein, articles may be printed larger than their desired size, and they may thereafter shrink to their desired dimensions. For example, when articles are printed with a 600 µm nozzle, the articles after sintering may have an effective resolution of approximately 486 µm.

EXAMPLES

It should be appreciated that the following Examples are for illustration purposes and are not intended to be construed as limiting the subject matter disclosed in this document to only the embodiments disclosed in these examples.

Example 1

Alumina slurries were prepared with 99.0% pure α-phase $Al_2O_3$ powders with an average particle diameter of 150 nm (Skyspring Nanomaterials, USA). Tri-ammonium citrate, 97% (titration), and molecular weight 243.22 g/mol (Sigma Aldrich, USA), was used to generate the direct coagulation. Tri-ammonium citrate was dissolved in de-ionized water at 0.3 wt % with respect to the alumina powder used, before being added to the powders at the desired volume fraction (vol %). A high energy ball mill (HEBM) (PQN04, Across International, USA) was used with alumina ball milling jars with 10 mm diameter alumina media at a mass ratio of 4:1 to powder mass. The jars had Viton gaskets, and were further sealed with parafilm and rubber tape to prevent the escape of any vapors arising during mixing. The sealed jars were then loaded into the HEBM and milled for one hour of "on" time, with a repeating cycle of 5:5 minutes "on": "off", at 580 rpm. Slurries with low viscosity and a pH around ~9.10 were produced. The pH was adjusted to approximately 4.50 with 2M nitric acid ($HNO_3$). During pH adjustment, the slurry thickened to a paste which did not deform under its own weight and required minutes to coagulate as opposed to seconds.

After pH adjustment, the slurry was loaded into syringes in a custom extruder based on the open source model "Universal Paste Extruder", (RichRap, Thingiverse.com). The extruder was modified with a metal transmission to allow higher extrusion pressure for a high viscosity slurry and smaller extrusion nozzles. The extruder was mounted on the gantry of a Lulzbot Mini 3D Printer (Aleph Objects, USA) with a glass print-bed. Machine control G-code for the printed parts was based on stereolithography files processed using the Cura slicer engine (Ultimaker, USA). The printer was placed in an enclosure to limit temperature gradients and air flow that may disturb the printing process. Nozzles with an inner diameter of 0.6 mm were used, and the parts were printed through a room temperature nozzle onto an unheated bed and allowed to cure before sintering.

Figure 8A:
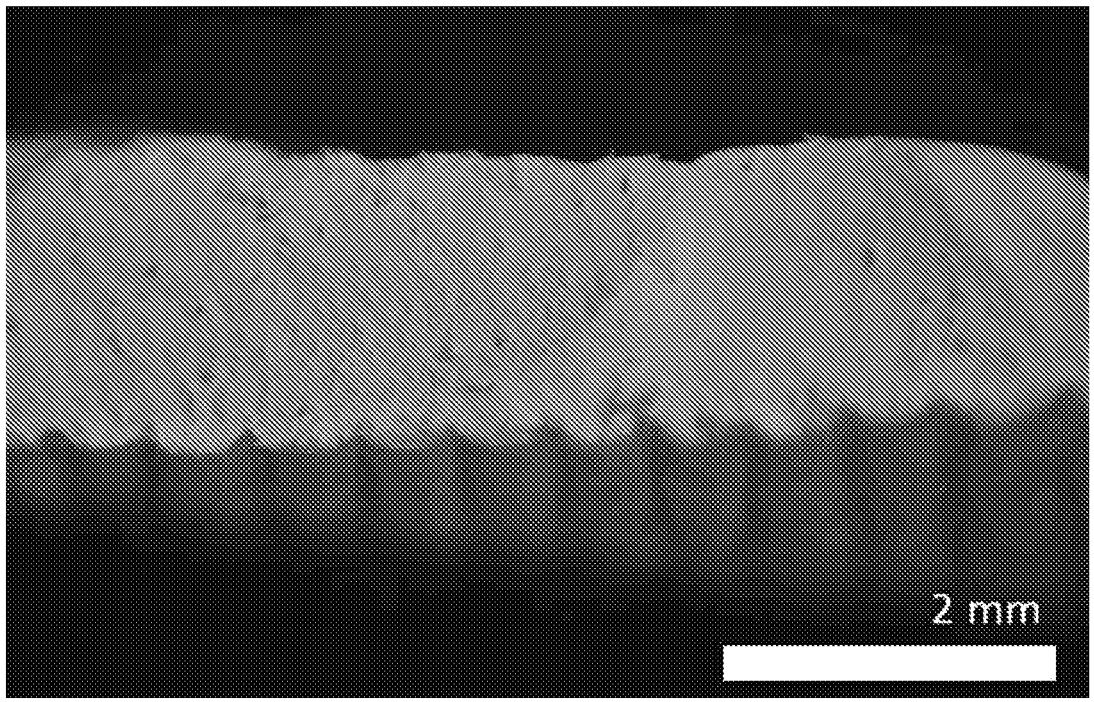
FIGS. 8A and 8B are photographic images taken at magnifications of 200× and 300×, respectively, of a section of an article made according to a process illustrated in FIG. 1.
Figure 8B:
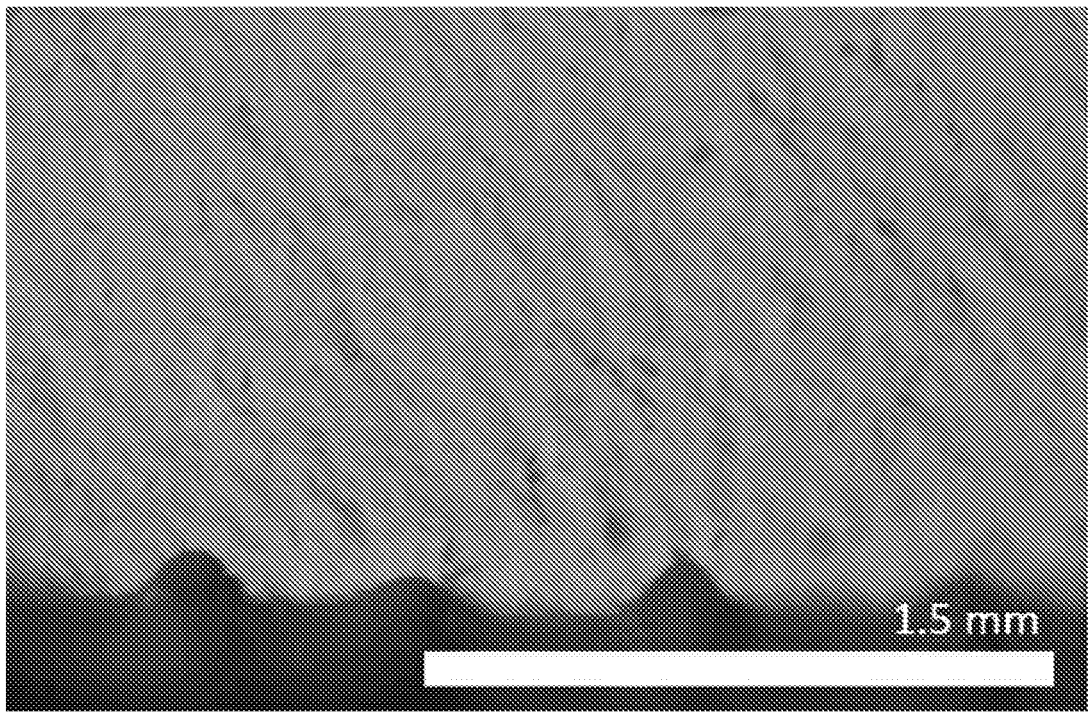

After curing, sintering of parts was performed in atmosphere in a high-temperature furnace (Thermolyne 4610, USA). The sintering schedule had a fast (100° C./minute) heating rate to above 1200° C., followed by a slower ramp (25° C./minute) to a hold temperature of either 1500, 1550, 1600, 1650, or 1750° C. for between 1 to 16 hours according to increase temperature. Samples were allowed to cool naturally in the furnace. No intermediate binder removal step was necessary between green and sintered states. As shown in the photographic images of FIGS. 8A and 8B, taken at magnifications of 200× and 300×, respectively, a section of a thin-walled part made according to the process of Example 1 shows homogenous bulk material with no observable separation between layers.

Figure 9A:
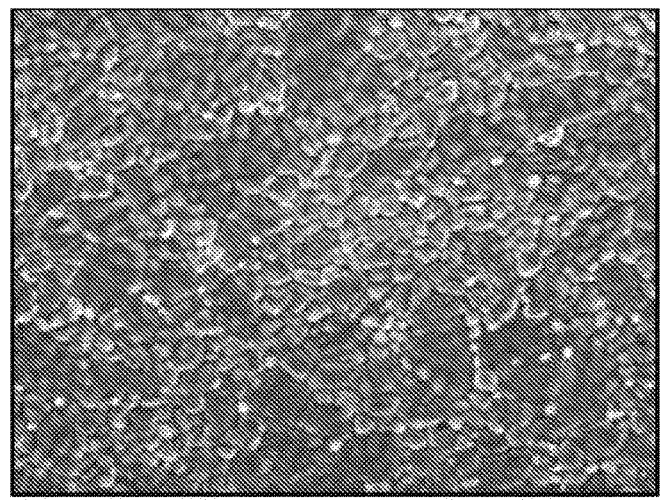
FIGS. 9A, 9B and 9C are SEM images having magnifications of 250×, 4,000× and 7,000×, respectively, of an article made by a process according to FIG. 1.
Figure 9B:
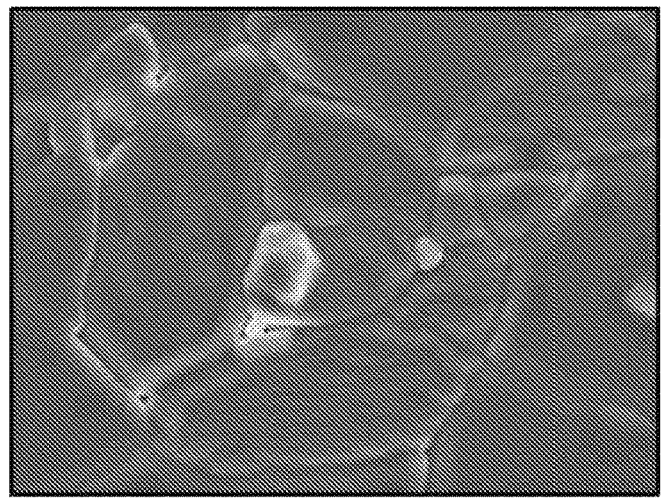
Figure 9C:
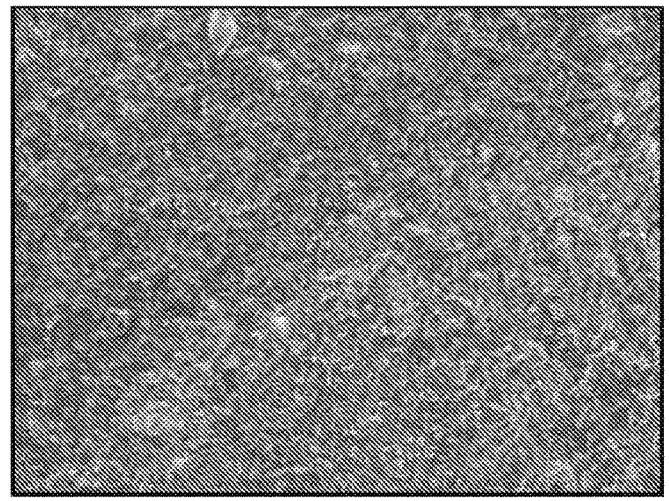

After free sintering in air according to previously mentioned heating schedules, densities of parts above 97% theoretical density were measured by both the Archimedes principle and areal methods. Areal density measurements were as high as 99.99% relative density. In addition to density, the microstructure of sintered parts was characterized in SEM, as shown by the SEM images of FIGS. 9A, 9B and 9C having magnifications of 250×, 4,000× and 7,000×, respectively. From these images, it can be seen that grain growth was roughly isotropic, resulting in roughly spherical grains and limited porosity. Average grain size was 2.2 µm±1 µm across a range of samples sintered from 1500-1750° C. for 1-16 hours.

Figure 11:
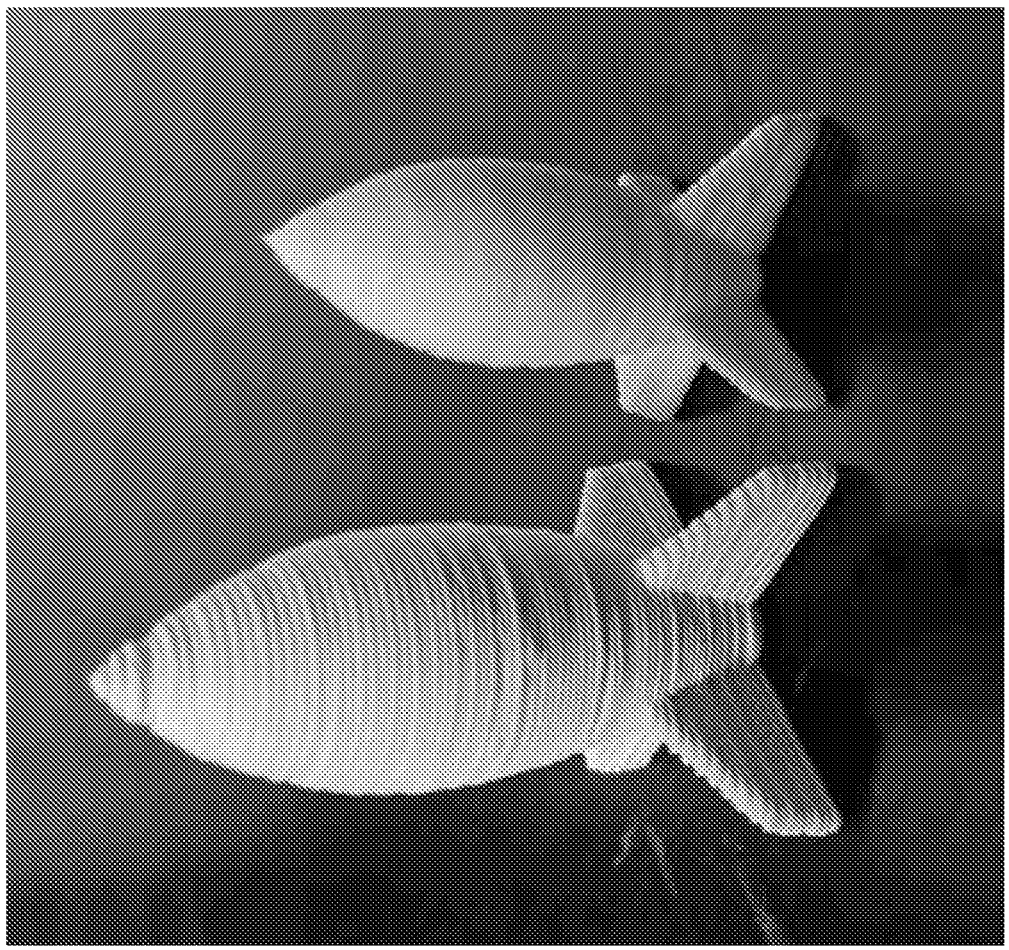
FIG. 11 is a photographic image illustrating shrinkage of an article after sintering relative to its green form.
Figure 10:
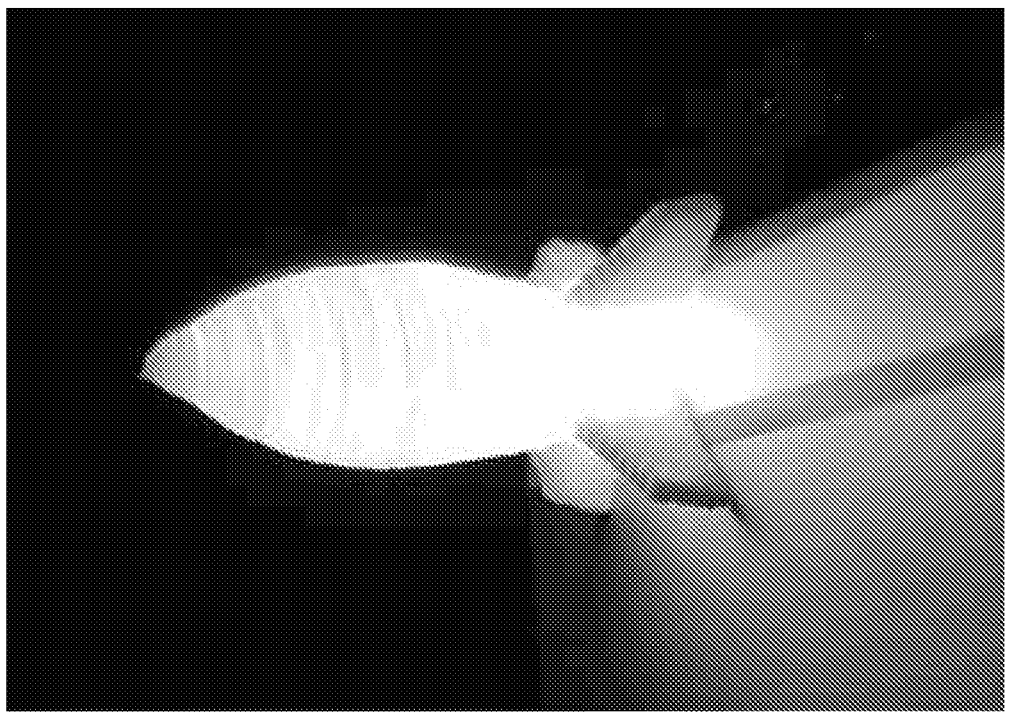
FIG. 10 is a photographic image of an article made by a process according to FIG. 1 illustrating the transmittal of light therethrough.

After sintering, parts made in accordance with Example 1 were translucent white and transmitted light through walls as thick as 2 mm, as demonstrated in the photographic image of FIG. 10. Transmittal of light in this nature suggests high relative density and purity of the part because of the sensitivity of optical properties of alumina to defects such as pores and impurities. Part shrinkage due to densification is found by measuring at least four features on select parts before and after sintering. It was found that, among 15 samples, there was an average isotropic shrinkage of 19% with a standard deviation of 3%. The photographic image of FIG. 11 shows a green part next to another that was printed identically and then sintered to full density.

Figure 12A:
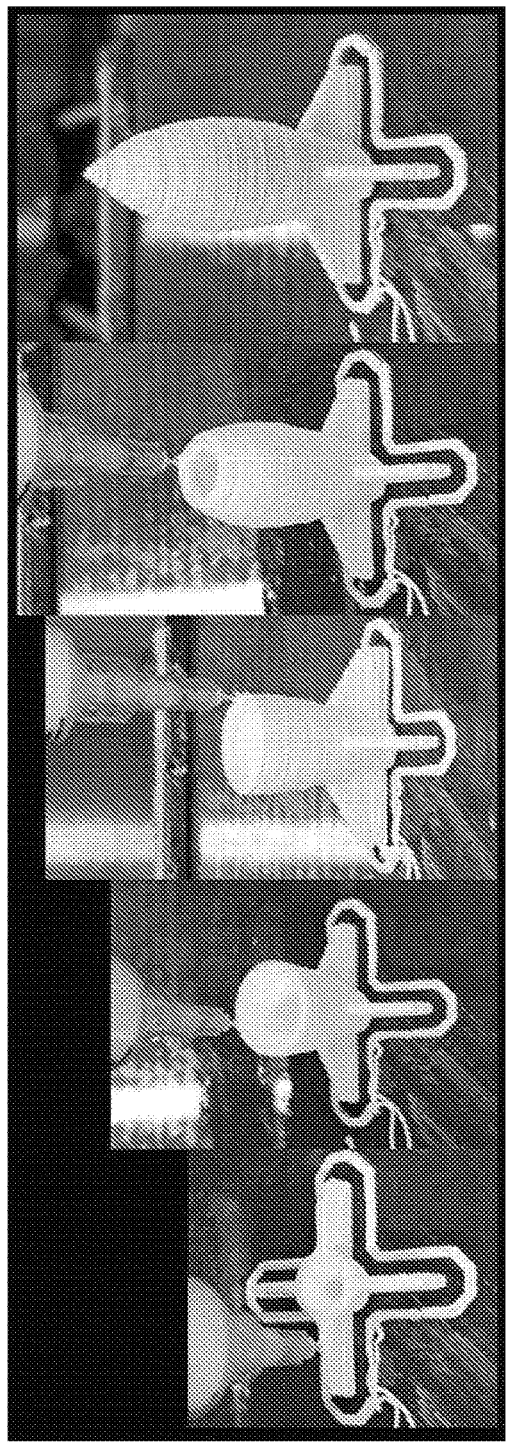
FIGS. 12A-12C are photographic images of different articles having complex geometries made by a process according to FIG. 1.
Figure 12C:
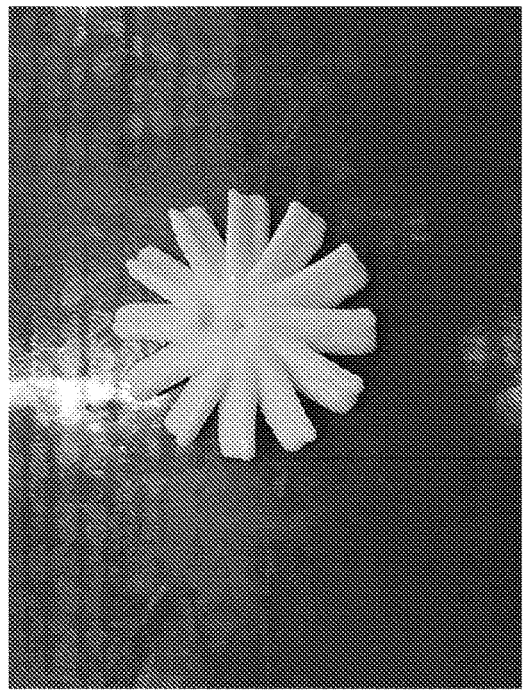
Figure 12B:
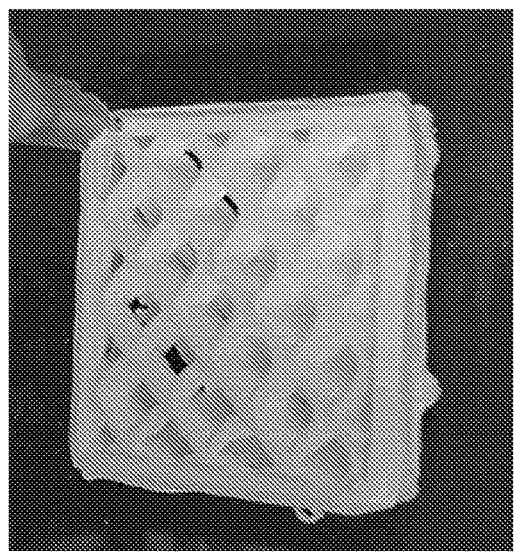

Referring now to the photographic images of FIGS. 12A-12C, it can be seen that several articles or parts having complex geometries were printed in accordance with the technique of Example 1. For example, the model rocket design of FIG. 12A has overhangs, while FIGS. 12B and 12C illustrate a closed-cell hollow part and a fully dense turbine propeller, respectively. Each of the parts or articles illustrated in FIGS. 12A-12C were printed without the use of support material.

Parts printed in accordance with the technique of Example 1 were evaluated by minimum feature size as well as green density, strength, cure time, and layer adhesion. Density of parts was found by both Archimedes and areal density methods, and grain size was determined by digital image analysis of SEM micrographs of polished surfaces using ImageJ (Broken Symmetry Software). Specifically, the three-circle method was used according to ASTM E112. Minimum feature size was found to be 620 µm, 20 µm of which was due to spreading after leaving the nozzle. Also, parts did not deform under their own weight implying that coagulation occurs. Green parts were, on average, 53% theoretical density with some samples as high as 65%. Green strength of parts was too low to be measured by the available load cell; however, green strength was sufficient for part removal from the build plate and handling without failure before sintering.

Mechanical Testing

As indicated above, density of parts was found by both Archimedes and areal density methods. Grain size was determined by digital image analysis of SEM micrographs of polished surfaces using ImageJ (Broken Symmetry Software). Specifically, the three-circle method was used according to ASTM E112. The average Vicker's hardness was found by Vicker's indent according to ASTM E384-16 using an HV1000Z Microhardness Tester (Pace Technologies, USA) with an applied load of 9.8 kgf and 15 seconds hold time. Flexural modulus and flexural strength were measured using four point bending according to ASTM(C1161) on an Instron testing machine (Model 8501, Instron, USA) with a crosshead speed of 0.127 mm/min.

Figure 13:
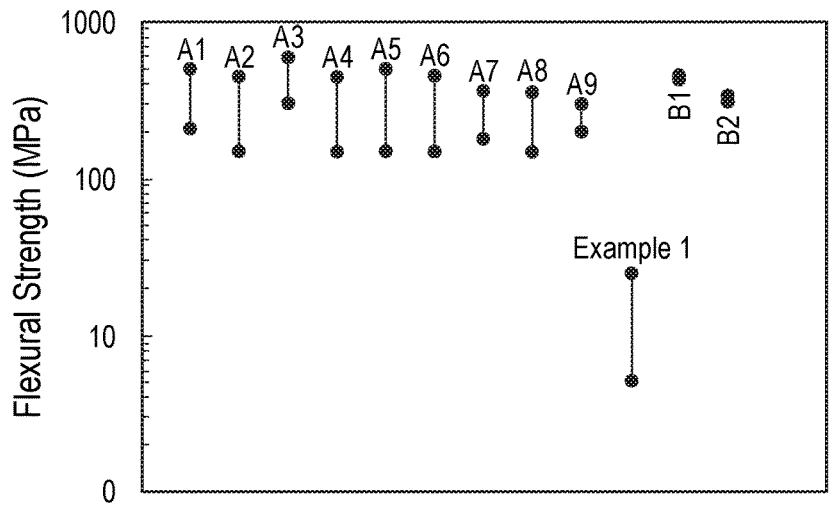
FIG. 13 is a graphical illustration of flexural strength of various articles made by a process according to FIG. 1 relative to articles made through a conventional process.

To assure comparability with bulk alumina, the mechanical properties of parts printed according to the technique of Example 1 were measured. Samples displayed an average hardness of 1788 HV. Flexural modulus and flexural strength averaged 10.8 MPa and 173 GPa, respectively. Results found in this study were compared to published values from a wide range of industrial applications and minimum requirements. Specifically, nine commercial grades of alumina and two fine grained (1-2 µm and 10-15 µm) samples (B1-B2), produced by conventional sintering methods, were compared to samples produced in accordance with the technique of Example 1. The nine grades were split into two main groups, the first being A1-A5, having relative densities of at least 99%, and the second group being A6-A9, with relative densities between 80% and 99%. These main groups can be divided into sub-classes according to type, purity, and intended service. This study was intended to compare properties of conventionally fabricated parts to those made in accordance with Example 1. It is noted that parts made in accordance with Example 1 can result in macro-scale structural defects that can affect the observed properties, regardless of the microstructure. Similarly, flexural strength of parts produced in accordance with Example 1 were less than reported values for commercial alumina as evidenced in FIG. 13.

Figure 14:
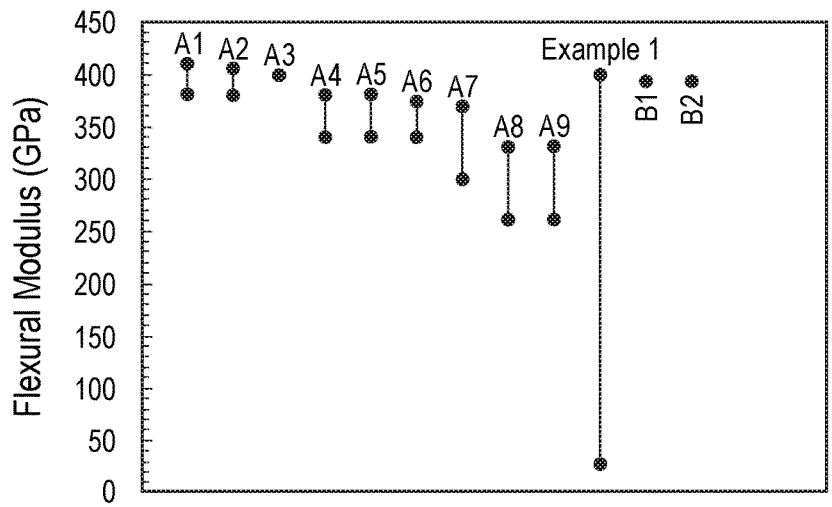
FIG. 14 is a graphical illustration of flexural modulus of various articles made by a process according to FIG. 1 relative to articles made through a conventional process.
Figure 15:
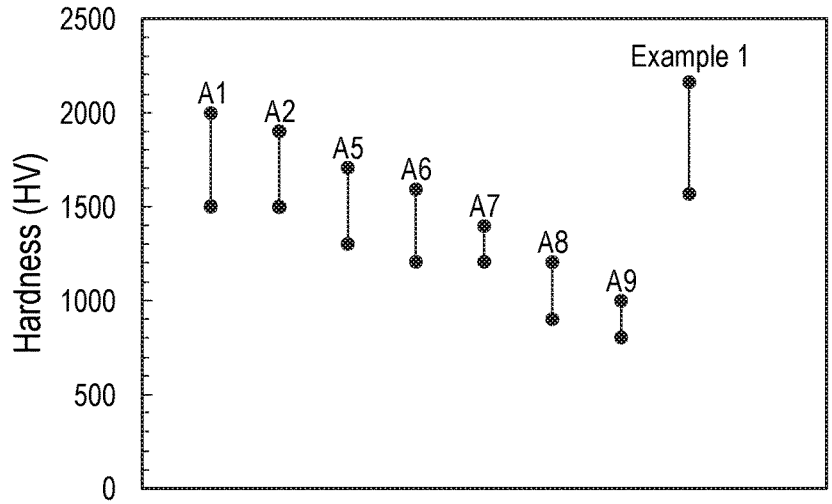
FIG. 15 is a graphical illustration of hardness of various articles made by a process according to FIG. 1 relative to articles made through a conventional process.

The flexural modulus of parts made in accordance with Example 1, however, was very comparable to high-grade commercial alumina, with values as high as 400 GPa as shown in FIG. 14. It can be seen from FIG. 15 that hardness of printed samples was in the same range as the hardest commercial grades. Based on these results, the printed parts may have potential application in products requiring wear resistance, along with any applications for which mechanical strength is not of special importance, such as electrical insulation and refractory applications.

Although low strength was measured, it is anticipated that tuning of the toolpaths or other printing parameters may improve mechanical properties. Similarly, the printing parameters utilized in the technique of Example 1 may have allowed for macrostructural defects leading to reduced flexural strength, without effecting properties of the microstructure because modulus is an intrinsic property of the material and hardness is tested on a very small region.

During formation of the parts in accordance with Example 1, some nozzle clogging was observed during extrusion. Clogging of this nature can lead to complete printing failure, but more often leads to inconsistency in extrusion flow rate, which can lead to uneven printing. Along with this, significant flaws can arise when there is no capability to modify the extruder toolpath to mitigate staircasing, chord approximation, and perimeter overlap defects, as is the case with the Cura slicer engine utilized. It is speculated that both of these effects are a source of internal pores and flaws in what should be solid structures, such as the beams tested for flexural strength. Assuming printed parts have fracture toughness comparable to published values (4 MPa $\sqrt{m}$)[33]-[35], internal flaw size leading to fracture at the observed stress can be calculated using Equation (5) where $K_{IC}$, is fracture toughness, Y is a geometrical constant, $\sigma_F$ is stress at failure, and a is half the length of an internal pore.

$$K_{IC}=Y\sigma_F\sqrt{\pi a} \qquad (5)$$

This calculation shows that a flaw of approximately 100 µm would be sufficient to result in the observed low flexural strength. With the extruder nozzle moving at the printing speed of 10 mm/s, a flaw of this size would only require inconsistent extrusion for ~0.01 s. While hardness, flexural modulus, and translucency of samples suggest the quality of parts printed in accordance with Example 1 is consistent with the highest commercial grades of alumina, relatively large internal flaws due to inconsistent extrusion would account for samples breaking under relatively low loads, resulting in the low flexural strength values observed. With more precise control of coagulation rate and extrusion flow rate, it is anticipated that this inconsistency can be mitigated.

In one form, there is provided a binderless extrusion method of additive manufacturing using, for example, nanopowder or nanoparticle slurries. In this or another form, fully dense articles having complex geometries are prepared according to an additive manufacturing process. In one aspect of this form, contamination due to binder presence and subsequent removal thereof before sintering is avoided, and the articles retain a small-grained microstructure having consistent uniformity. In another aspect of this form, the articles may include, for example, overhangs or hollow enclosures. In one aspect, the articles may be useful in heat exchanger, condenser, biomedical implant, chemical reactant vessel, and/or electrical isolation applications.

In one embodiment, a method for additive manufacturing an article includes preparing a mixture including a slurry of an article forming material through the addition of a dispersant to the material in the absence of a binder. The method also includes adjusting the pH of the mixture to control at least one of viscosity and a coagulation rate of the slurry, and passing the mixture through an extrusion-based three-dimensional printing apparatus to form the article. In one form, the article forming material includes nanoparticles. In an aspect of this form, the nanoparticles include alumina nanoparticles. In another form, the dispersant is tri-ammonium citrate. In still another form, the method also includes sintering the article following extruding.

In yet another form, adjusting the pH of the slurry includes adding an acid to the slurry and lowering the pH of the slurry. In still another form, the pH is lowered in order to increase viscosity and extend the coagulation rate. In another form, the dispersant is dissolved in de-ionized water before addition to the ceramic material. In a further form, the method also includes ball milling the mixture. In one aspect, the ball milling is conducted with the mixture hermetically sealed from ambient atmospheric conditions. In another aspect, the pH of the mixture is lowered following the ball milling.

In another embodiment, a method includes preparing a mixture including a slurry of an article forming material and a dispersant, passing the mixture through an extrusion-based three dimensional printing apparatus to form an article in a green state, and sintering the article in the green state without performing an intermediate binder removal heating step to provide the article in a sintered state. In one form, preparing the mixture is done in the absence of a binder. In another form, the method further includes adjusting the pH of the mixture to control at least one of viscosity and a coagulation rate of the slurry. In one aspect, the pH of the mixture is decreased and the viscosity is increased. In another aspect, the pH of the mixture is decreased and the coagulation rate is extended. In yet another form, the article forming material includes alumina nanoparticles. In still a further form, the dispersant is a polyvalent salt. In one aspect, the polyvalent salt is tri-ammonium citrate. In another form, the mixture has a viscosity facilitating the article in the green state to retain a near-net geometry. In yet another form, the article forming material includes nanoparticles.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for additive manufacturing an article, comprising:
    preparing a mixture including a slurry of an article forming material through the addition of a dispersant to the article forming material in the absence of a binder, wherein the dispersant is a polyvalent salt;
    adjusting the pH of the mixture to control at least one of viscosity and a coagulation rate of the slurry; and
    passing the mixture through an extrusion-based three-dimensional printing apparatus to form the article.

2. The method of claim 1, wherein the article forming material includes nanoparticles.

3. The method of claim 2, wherein the nanoparticles include alumina nanoparticles.

4. The method of claim 1, wherein the dispersant is tri-ammonium citrate.

5. The method of claim 1, further comprising sintering the article.

6. The method of claim 1, wherein adjusting the pH of the slurry includes lowering the pH of the slurry by adding an acid to the slurry.

7. The method of claim 1, wherein the pH is lowered in order to increase viscosity and extend the coagulation rate.

8. The method of claim 1, wherein the dispersant is dissolved in de-ionized water before addition to the article forming material.

9. The method of claim 1, further comprising ball milling the mixture.

10. The method of claim 9, wherein the ball milling is conducted with the mixture hermetically sealed from ambient atmospheric conditions.

11. The method of claim 9, wherein the pH of the mixture is lowered following the ball milling.

12. A method, comprising:
    preparing a mixture including a slurry of an article forming material and a dispersant, wherein the dispersant is a polyvalent salt;
    passing the mixture through an extrusion-based three-dimensional printing apparatus to form an article in a green state; and
    sintering the article in the green state without performing an intermediate binder removal heating step to provide the article in a sintered state.

13. The method of claim 12, wherein preparing the mixture is done in the absence of a binder.

14. The method of claim 12, further comprising adjusting the pH of the mixture to control at least one of viscosity and a coagulation rate of the slurry.

15. The method of claim 14, wherein the pH of the mixture is decreased and the viscosity is increased.

16. The method of claim 14, wherein the pH of the mixture is decreased and the coagulation rate is extended.

17. The method of claim 12, wherein the article forming material includes nanoparticles.

18. The method of claim 12, wherein the polyvalent salt is tri-ammonium citrate.

19. The method of claim 12, wherein the mixture has a viscosity facilitating the article in the green state to retain a near-net geometry.

20. The method of claim 12, wherein the article forming material includes ceramic nanoparticles.

* * * * *